Nov. 18, 1930.  A. B. CADMAN  1,782,115
TRAILER VEHICLE
Filed March 5, 1926   5 Sheets-Sheet 1
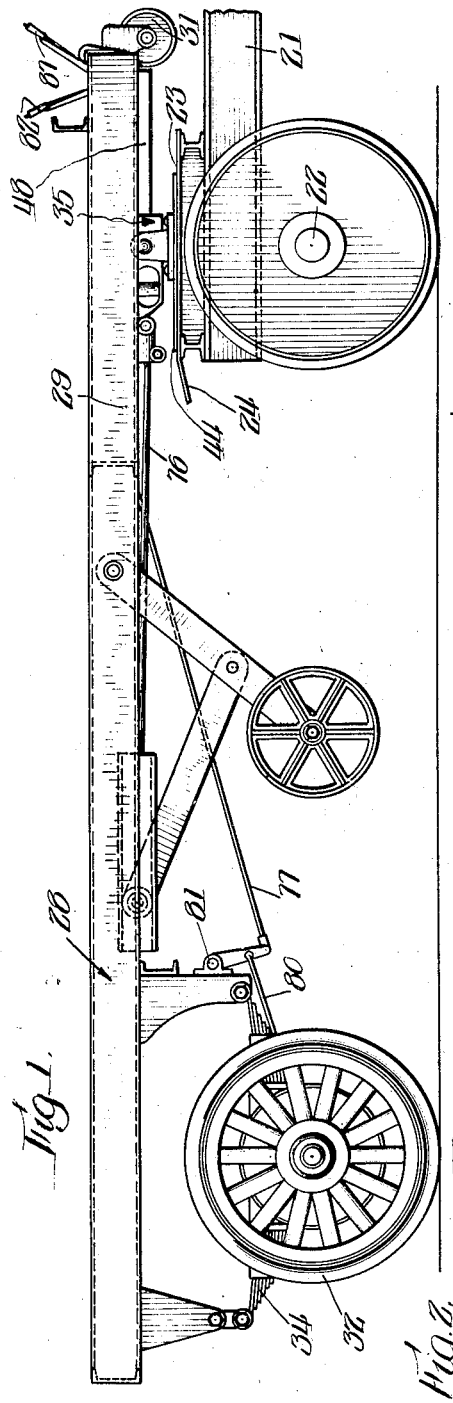
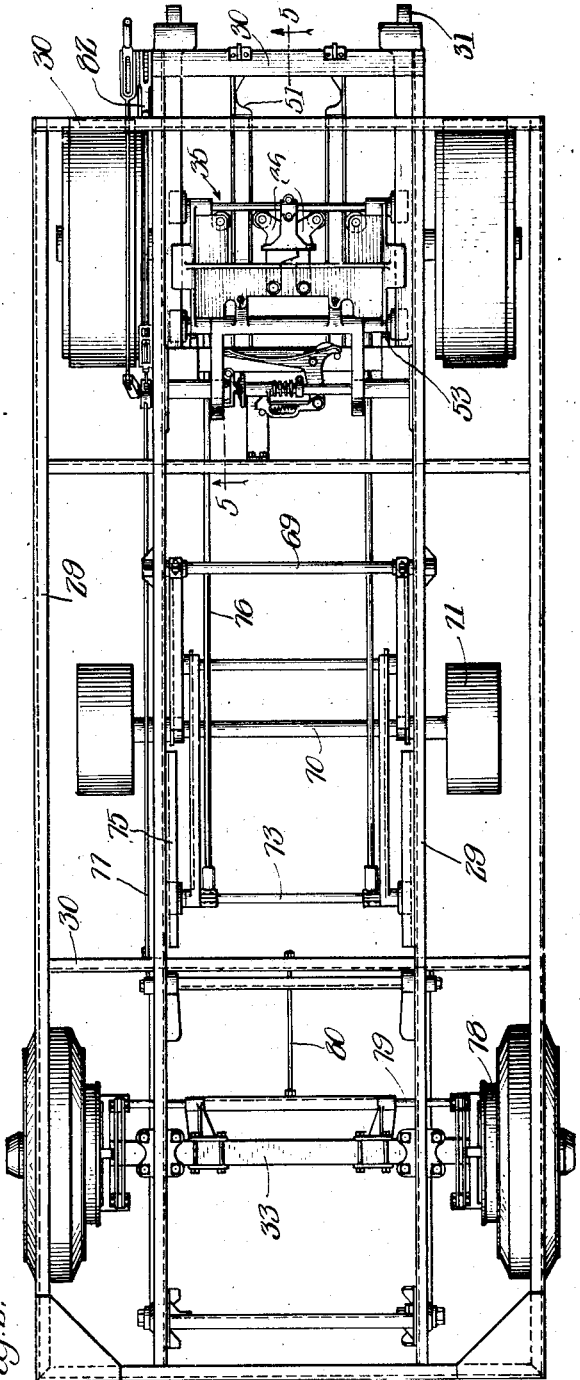

Nov. 18, 1930.  A. B. CADMAN  1,782,115
TRAILER VEHICLE
Filed March 5, 1926  5 Sheets-Sheet 2
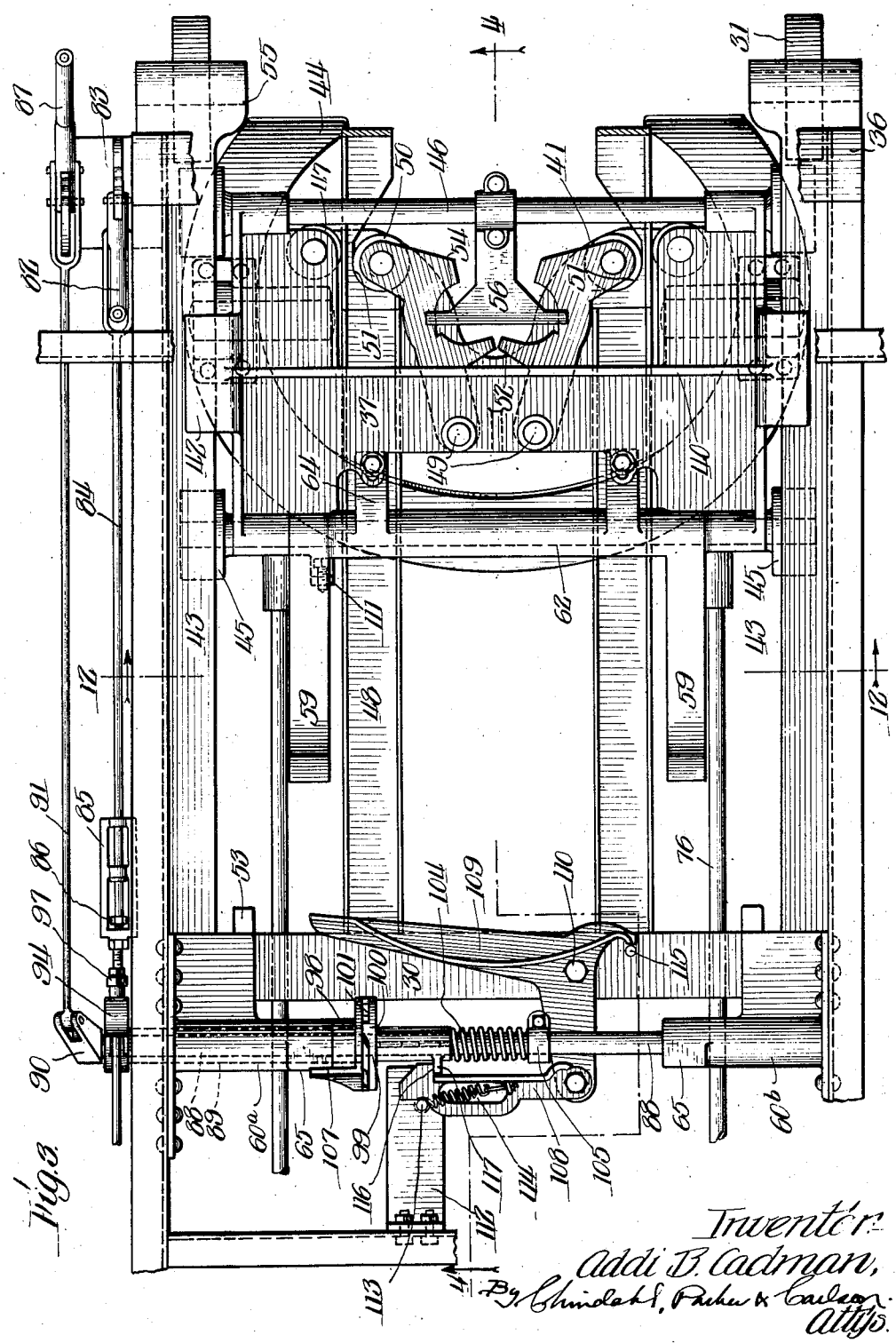
Inventor
Addi B. Cadman,
By Chindahl, Parker & Carlson
Attys.

Nov. 18, 1930.  A. B. CADMAN  1,782,115
TRAILER VEHICLE
Filed March 5, 1926   5 Sheets-Sheet 3
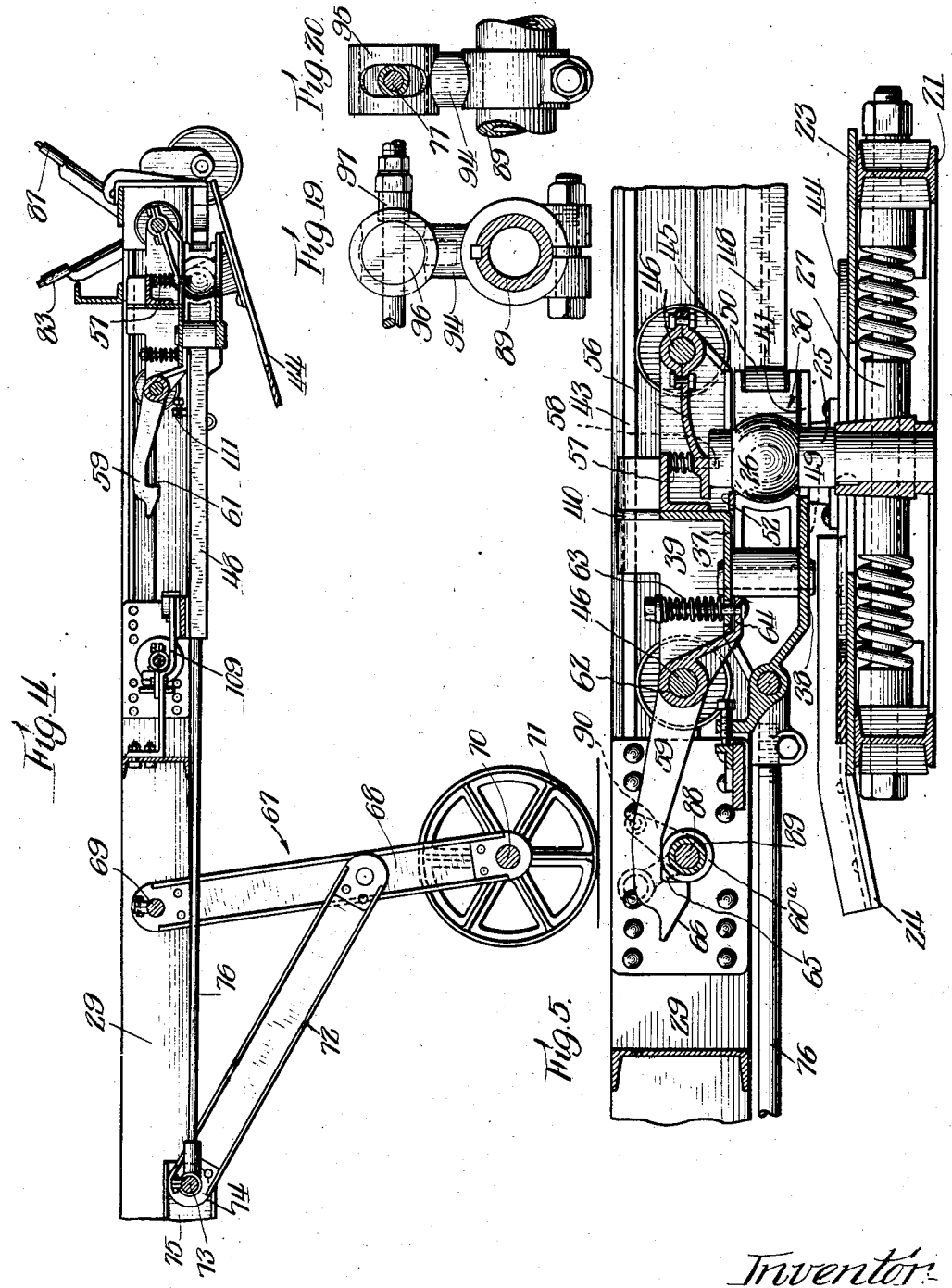
Inventor:
Addi B. Cadman,
By Shindel, Parker a Carlson
Attys.

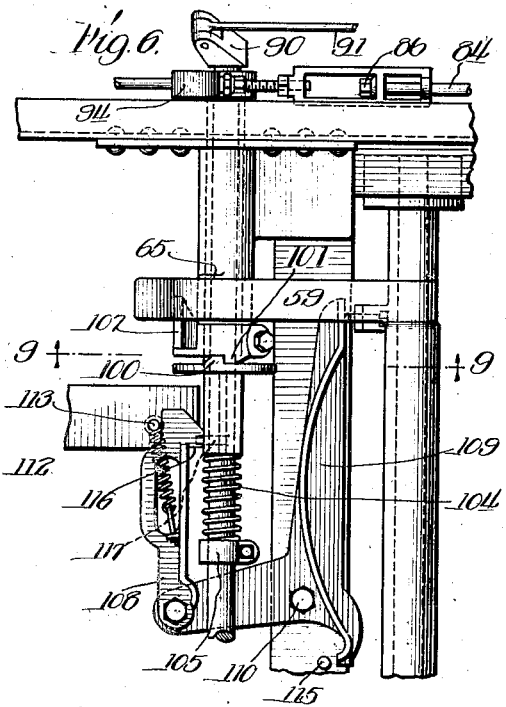
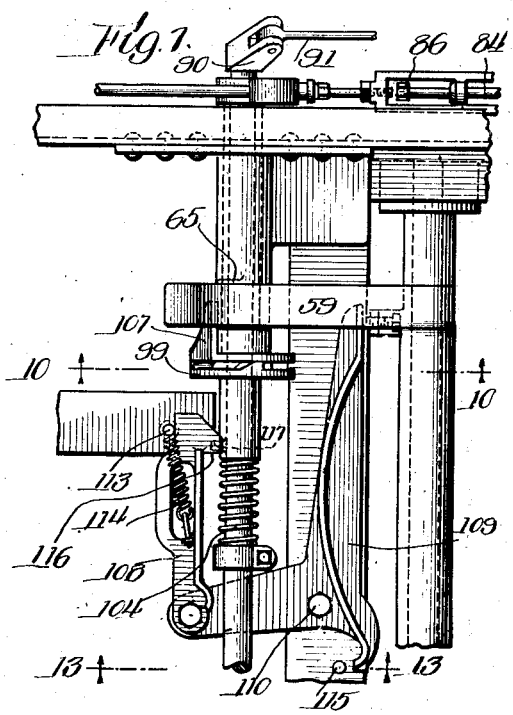
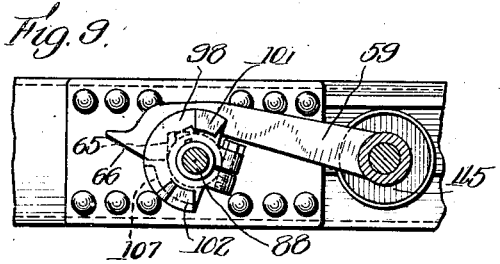
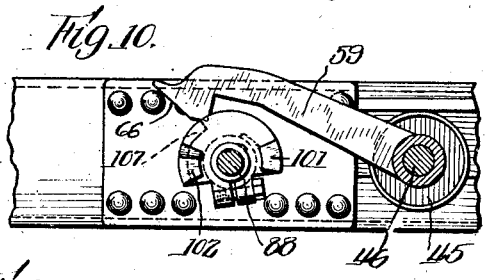
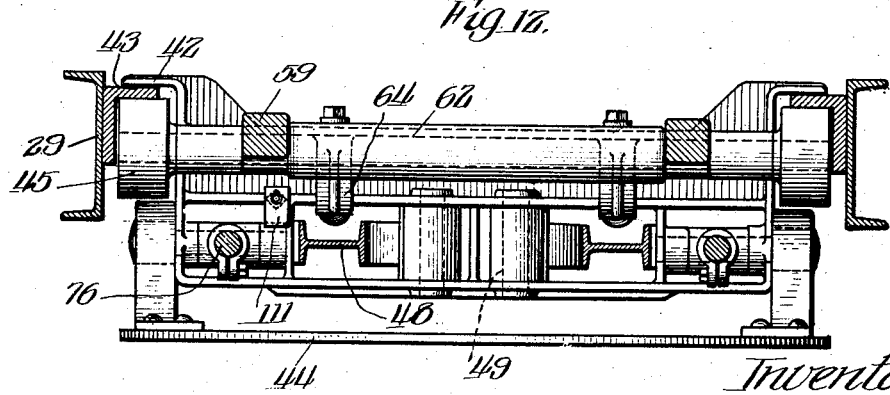

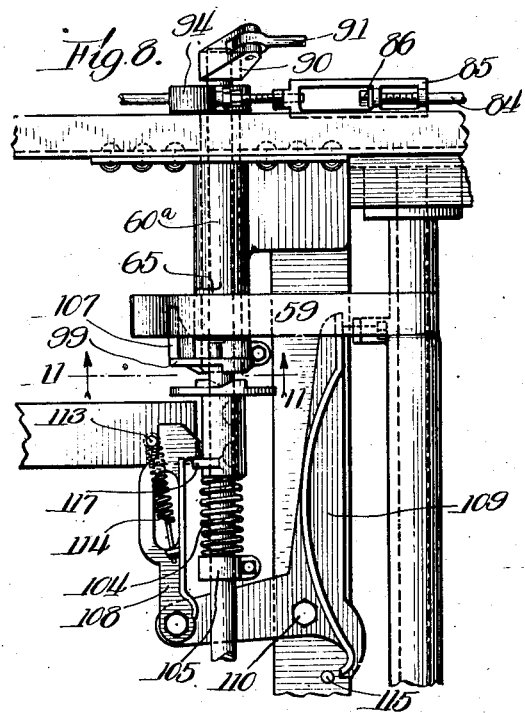

Patented Nov. 18, 1930

1,782,115

UNITED STATES PATENT OFFICE

ADDI BENJAMIN CADMAN, OF BELOIT, WISCONSIN, ASSIGNOR TO WARNER MFG. CO., OF SOUTH BELOIT, ILLINOIS, A CORPORATION OF MICHIGAN

TRAILER VEHICLE

Application filed March 5, 1926. Serial No. 92,428.

The present invention relates to a vehicle comprising a tractor section and a so-called semi-trailer which are adapted to be coupled together for combined operation. More particularly, the invention refers to improvements in the construction of the trailer.

An important object of the invention is to provide an improved semi-trailer in which all of the essential coupling and uncoupling operations are, in so far as is practicable, effected automatically by relative movement between the trailer and its tractor.

A more detailed object is to provide a semi-trailer having a carriage which slides back and forth during coupling and uncoupling of the trailer and its tractor and automatically actuates the vehicle coupling mechanism, the trailer brakes and the supporting legs of the trailer under the control of a single hand lever which need be operated by the driver but once during each cycle of coupling and uncoupling operations.

In carrying out the above objects I provide on the trailer a novel control mechanism through which the brakes are set and the coupling mechanism is released manually to permit uncoupling the trailer and its tractor, such manual operation also serving to condition the control mechanism so that releasing of the brakes and locking of the coupling mechanism will be effected automatically at the completion of the coupling operation by a coupling carriage which is slid back and forth by relative movement between the trailer and tractor.

Another object of the invention is to provide a tractor-trailer coupling mechanism of new and improved construction.

The invention also aims to provide a semi-trailer having two brake levers, one to be used to apply the brakes prior to detaching of the trailer and the other to be used as an emergency brake during combined operation of the tractor and trailer.

Still another object of the invention is to provide a tractor-trailer vehicle having a novel fifth-wheel construction associated with the coupling mechanism by which the two vehicle sections are detachably connected together.

A further object is to provide a semi-trailer having an element mounted to move back and forth on the trailer during coupling and uncoupling of the trailer and its tractor together with a novel means for controlling the operation of the means for latching said elements in its rearmost position whereby to minimize the number of operations which must be performed by the vehicle driver in order to effect a coupling and uncoupling cycle.

Other objects and advantages of the invention will become apparent from the following detailed description taken in connection with the accompanying drawings in which—

Figure 1 is a side elevational view showing a trailer chassis embodying the features of my invention and a portion of its tractor.

Fig. 2 is a plan view of the trailer and tractor shown in Figure 1.

Fig. 3 is a fragmentary plan view of the detached trailer.

Fig. 4 is a sectional view along the line 4—4 of Figure 3 and also showing the trailer landing gear in active position.

Fig. 5 is a fragmental sectional view along the line 5—5 of Figure 2.

Figs. 6, 7 and 8 are fragmentary plan views of the control mechanism.

Figs. 9, 10 and 11 are sectional views taken along the lines 9—9, 10—10 and 11—11 of Figs. 6, 7 and 8 respectively.

Fig. 12 is a transverse section taken along the line 12—12 of Figure 3.

Fig. 13 is a section taken along the line 13—13 of Fig. 7.

Fig. 14 is a fragmentary elevational view taken from the left hand side of the trailer.

Figs. 15 to 18 are elevational views of parts of the control mechanism.

Figs. 19 and 20 are fragmentary views of parts of the brake rod connections.

While I have shown in the drawings and will describe herein one embodiment of the invention for the purposes of illustration, it is to be understood that I do not intend to be limited thereby to the form disclosed but aim in the appended claims to cover all modifications and alternative constructions falling within the spirit and scope of the invention.

Briefly, the invention in the exemplary embodiment illustrated in the drawings comprises a semi-trailer chassis, a tractor adapted to support the forward end of the trailer during combined operation of the two, movable landing gear for supporting the trailer when detached, brakes for the trailer, and coupling mechanism including means for locking the tractor and trailer in coupled relation. All of these operating mechanisms are associated with a part of the coupling mechanism hereinafter called the coupling carriage or head which is arranged to slide back and forth in the trailer frame during coupling and uncoupling. The landing gear is directly connected to the carriage and therefore is raised and lowered during rearward and forward movements respectively of the carriage. Mounted in the trailer frame and associated with the carriage is a mechanism which controls the operation of the brakes and the movements of the coupling carriage. The construction of this control mechanism is such that as the carriage reaches the end of its rearward or coupling stroke the brakes will be released and the coupling mechanism will become locked automatically in the trailer frame. Setting of the brakes and unlocking of the coupling mechanism to permit detachment of the trailer is effected through the control mechanism by operating a hand lever on the trailer just prior to uncoupling which manual operation also serves to set the control mechanism so that releasing of the brakes and locking of the coupling mechanism can be effected automatically by the carriage when the tractor and trailer are again coupled together.

Referring now to Figs. 1 and 5, the tractor section which is shown herein to illustrate the use of the trailer, comprises a frame 21 supported from a rear axle 22 through springs (not shown). Mounted upon the frame is a horizontal plate 23 which constitutes a stationary fifth wheel member. The rear end of this plate is bent downwardly to form an inclined track 24 which serves to raise and lower the forward end of the trailer during coupling and uncoupling, thereby compensating for irregularities in the ground surface upon which the trailer supports rest. Tractive force is applied by the tractor through a king pin 25 having a spherical portion 26 near its upper end. Preferably the king pin projects through the central part of the plate 23 and is yieldingly mounted on slide rods 27 which are supported from the trailer frame.

The body (not shown) of the semi-trailer may be built upon a horizontal frame structure 28 which is adapted to overlie the rear end of the tractor when the vehicles are coupled together. The frame is composed of longitudinally extending channel bars 29 secured together by suitable cross pieces 30. Preferably, though not necessarily, the inner frame bars project beyond the foremost cross piece and are equipped with wheels 31 which roll up and down the track 24 during coupling and uncoupling. At its rear end the trailer frame is supported in any preferred manner by wheels 32 through a rear axle 33 and springs 34.

*The trailer coupling mechanism*

This mechanism, which is mounted to slide back and forth in the trailer frame comprises three parts, namely, the coupling carriage 35 previously alluded to, a pair of movable jaws 36 which constitute a socket for the tractor king pin, and means for locking the carriage in the trailer frame. In the present instance, the carriage is a unitary casting, generally rectangular in shape and having spaced apart top and bottom walls 37 and 38 and side walls 39, the latter projecting a substantial distance above the top wall and being connected together by a vertical rib 40. The bottom wall is formed with a V-notch 41, the edges of which guide the tractor king pin into its socket during coupling as will appear later.

The carriage is slidably supported in the trailer frame by horizontal flanges 42 which project laterally from the side walls of the carriage and overlie flanges 43 of angle bars secured along the inner sides of the inner frame bars. Pivotally mounted on the side walls of the carriage is a movable fifth-wheel member in the form of a circular plate 44 which rests upon the plate 23 and sustains the weight of the forward end of the trailer when the vehicles are coupled together. Preferably, the forward portion of the plate is cut away so as to receive the king pin 25 when the tractor and trailer are being united. Since the member 44 is mounted to turn on a horizontal axis, it provides for vertical swiveling between the tractor and trailer during traveling. The weight of the trailer frame on the carriage, when the latter is resting upon the tractor, is sustained by wheels 45 which are adapted to roll along the underside of the flanges 43 as the carriage slides in the trailer frame. The wheels 45 are mounted on the ends of the front and rear axles 46 which are journaled at their upper ends in bearings cast on the carriage. A shiftable point of support between the tractor and trailer is thus provided. To hold the carriage against lateral movement, rollers 47 are mounted on vertical axes between the top and bottom walls of the carriage in position to roll along the outer sides of two parallel bars 48. These bars are supported longitudinally in the trailer frame by two of the cross pieces 30.

The coupling jaws 36 are located in the front portion of the carriage and are adapted to be closed about the tractor king pin automatically at the beginning of the coupling operation and to be opened automatically at the end of the uncoupling operation. To this end, the jaws are made in the form of elongated castings pivoted at their rear ends on spaced vertical pins 49 extending between the top and bottom walls of the carriage on opposite sides of the center of the trailer frame. At their forward ends, the jaws are bifurcated and are equipped with rollers 50 which are received in opposed recesses 51 at the forward ends of the bars 48 when the carriage is in its foremost or uncoupled position. As the carriage moves rearwardly toward and from its rearmost or traveling position, the rollers ride along the inner surfaces of the bars 48 as shown in Fig. 1. About midway between their ends the jaws have complementary concave surfaces forming a coupling socket which fits snugly about the spherical portion of the tractor king pin when the jaws are closed together. To close the socket automatically as the tractor backs under the trailer at the beginning of the coupling operation, projections 52 are formed on the jaws in position to be struck by the cylindrical upper end of the king pin. This swings the jaws together, the projections 52 moving by each other in overlapping relation. The inner surfaces of recesses 51 acting as cams also assist in this movement of the jaws while the inner parallel surfaces of the bars 48 serve to hold the jaws cammed together. Thus, the coupling carriage will be locked to the tractor, and continued rearward movement of the tractor will move the carriage rearwardly until it strikes stops 53 on the trailer frame. During uncoupling, the carriage is moved forwardly by the tractor, the coupling socket remaining closed until the rollers 50 reach the recesses 51 at the end of the uncoupling operation. At this point, the king pin acting as a cam on the forward edges 54 of the coupling jaws, will spread them apart thereby freeing itself automatically from the carriage. Such forward movement of the carriage is arrested in the present instance when the front wheels 45 strike against brackets 55 which carry the antifriction wheels 31.

To hold the coupling jaws spread apart when the tractor is detached, a tongue 56 is pivoted on the front carriage axle 46 and is pressed downwardly by a spring 57. As the coupling jaws spread apart to free the king pin thereby detaching the tractor, an elongated lug 58 depending from the tongue drops into the coupling socket (see Fig. 4). Then, when the tractor backs under the trailer at the beginning of the coupling operation, the upper end of the king pin engages the tongue and cams it upwardly moving the lugs 58 out of the space between the jaws (see Fig. 5). The tongue 56 also constitutes a means for locking the carriage in its foremost or uncoupled position so that the landing gear will be locked in land-engaging position. This is because the tongue holds the jaws 36 spread apart with their rollers 50 in the cam recesses 51, the carriage being thereby held in its forward position since the bars 48 will permit it to move rearwardly only when the jaws are closed together.

As a means for locking the carriage to the trailer frame and thereby holding the coupling socket closed, two latches 59 are pivoted on the carriage and arranged to become engaged behind two alined brackets 60ª and 60ᵇ at the instant the carriage reaches its rearmost position. In the present instance, each latch has a hooked portion 61 near its end and at its forward end is formed integral with a sleeve 62 mounted on the rear carriage axle 46. Springs 63 acting upwardly on arms 64 formed on the sleeve, serve to yieldingly press the latches downwardly, such movement being limited when the arms 64 strike against the underside of the top wall 37. Preferably the brackets are tubular in form and have flanged outer ends which are rigidly secured to the inner frame bars on the inner side thereof. Vertical shoulders 65 are provided on the rear side of the brackets in alinement with the latches. As the carriage approaches its limit of travel rearwardly, the brackets acting as cams on inclined latch surfaces 66 will raise the latches. Then, when the hooked portions 61 pass the shoulders 65, the latches will spring downwardly behind the shoulders thereby automatically locking the carriage against forward movement in the trailer frame. Since the carriage has been previously locked to the tractor, the tractor and trailer will now be locked together in coupled relation, and the tractive force applied to the carriage by the tractor will be transmitted directly to the trailer frame through the latches and the brackets. The means for releasing the latches to permit forward movement of the carriage will be described later.

*Trailer supporting means*

When the trailer is detached from the tractor, it is supported at its forward end by a swingable frame 67 which is moved into and out of active position by the coupling carriage. The frame comprises two bars 68 pivoted at their upper ends upon a transverse shaft 69 on the trailer frame and connected at their lower ends by an axle 70 carrying land-engaging wheels 71. Intermediate its ends, the frame is pivotally connected with bars 72 which project upwardly and rearwardly and are connected at their upper ends by an axle 73. Each end of the latter carries a roller 74 which rides between the inturned flanges of a guide channel 75 secured along the inner side of one of the inner trailer frame bars. Rods 76 connecting the carriage with the axle 73 serves to transmit the movements of the carriage to the supporting frame, so that the frame will be swung downwardly as the carriage moves forwardly during uncoupling of the tractor and trailer and upwardly as the carriage moves rearwardly during coupling. Preferably the relation of parts is such that during uncoupling the frame will swing slightly beyond the vertical position as shown in Fig. 4 so that the weight of the trailer will tend to hold the supporting leg in active position. In this "over-center" position, the weight of the trailer will tend to move the carriage forwardly, but this is prevented since the carriage at this time is locked in its foremost position by the tongue 56 as above described. Thus, when the trailer is detached, the bars 72 will brace the supporting frame against movement by the weight of the trailer upon it.

*The trailer brakes*

Brakes of suitable form are provided on the trailer wheels and are adapted to be set by forward movement of a common brake rod 77 extending along one side of the trailer. Each of the brakes preferably comprises a drum 78 and a band (not shown) which may be expanded within the drum by rotation of the shaft 79. This shaft is operatively connected to the brake rod 77 through a rod 80, a shaft 81, and suitable crank mechanism. It will be understood that when the rod 77 is pulled forwardly and held in such position that the bands will be expanded to set the brakes. Also when the rod is released, the brake bands will automatically release themselves within the drums.

One means for setting the brakes comprises a manually operable lever 82 pivoted on the trailer frame and having means such as a notch segment 83 which is engaged by a latch finger 83ª for maintaining the lever in the desired position. The brakes are actuated by the lever through a rod 84 having its forward end pivotally connected to the lever 82 and its rear end extending slidably through the forward end of a connecting link 85. A stop 86 on the end of the rod 84 works against the end of the link when the brakes are being set. The link is adjustably connected to the rear end of the brake rod 77. By means of this sliding connection, it will be observed that the brake rod may be pulled forwardly while the lever 82 is retained in its rearward or inactive position In the present trailer, the lever 82 is merely used as an emergency lever, that is, when it is desired to check the speed of the trailer during travelling. Another means for setting the brakes will now be described.

*Brake and carriage control mechanism*

By means of this mechanism the brakes may be set and the latches 59 released by a single actuation of a manually operable control lever 87 when it is desired to detach the trailer from the tractor. Such movement of the control lever also serves to condition the various parts of the control mechanism so that the brakes may be released and the latches caught behind the brackets 60ª and 60ᵇ automatically at the completion of the coupling operation in a manner to be described later.

In the present embodiment of the trailer the control mechanism includes a transverse shaft 88 which is adapted to be oscillated through part of a revolution by movement of the lever 87 between its forward and rearward positions. One end of the shaft is journaled in the bracket 60ᵇ while the other is journaled in a sleeve 89 which has bearing in the bracket 60ª. Both the shaft 88 and sleeve 89 extend through the trailer frame, the shaft projecting a short distance beyond the end of the sleeve. On the end of the shaft is an upwardly extending crank arm 90 which has its free end connected to the lever 87 by a rod 91. Means such as a stationary toothed segment 92 and a latch finger 93 (see Fig. 14) are employed to maintain the control lever in set position.

Fixedly secured to the outer end of a sleeve 89 is an upstanding crank arm 94 (see Figs. 19 and 20) having a ring-shaped portion 95 at its free end in which a disk 96 is rotatably mounted. The brake rod 77 extends slidably through a diametrical hole in the disk and through peripheral slots in the ring portion in order that the emergency lever may apply the brakes without oscillating the sleeve 89. 97 is an adjustable stop on the brake rod against which the crank arm 94 works when the sleeve 89 is rotated clockwise, the link 85 sliding along the rod during this movement (see Fig. 3). The sleeve 89 and the shaft 88 are adapted to be operatively connected for conjoint rotation in one direction by means of a clutch having one element 98 rigidly secured to the inner end of the sleeve 89 and another element 99 splined on the shaft 88. These elements (see Figs. 15 to 18) have opposed flat faces on which are formed radial teeth 100 and 101. Preferably, the teeth have perpendicular faces 102 which interengage to rotate the clutch elements when the shaft is oscillated in a clockwise direction and inclined faces 103 which slide by each other as the shaft is oscillated counter-clockwise. The two elements therefore constitute a one-way clutch connection between the shaft and the sleeve. A compression spring 104 on the shaft 88 acting between a fixed collar 105 and the hub of the element 99 serves to hold the two elements yieldingly together. In order that the latches may be released by the control lever 87 when it is pulled forwardly to set the brakes an arm 106 is formed on the clutch element 98 having a horizontal shoulder 107 which underlies the adjacent latch. Thus, as the sleeve is rotated in a clockwise direction, the shoulder 107 will engage the surfaces 66 raising the latches until their hooked rods will be allowed to pass over the bracket shoulders when the carriage is moved forwardly by the tractor. The brakes will be maintained in set position and the latch releasing shoulder will be held upwardly so long as the lever 87 remains in its forward position and the clutch members are held together. If, however, the lever is released or the clutch members separated, it will be apparent that the brakes, due to their inherent tendency to assume inactive position, will release themselves, the sleeve being thereby rotated counter-clockwise and the shoulder 107 being lowered sufficiently to permit the latches to become engaged behind the brackets.

Suitable trigger means is provided for separating the clutch members automatically at the completion of the coupling operation whereby to release the brakes and to permit engagement of the latches. The means illustrated herein for this purpose comprises a horizontally slidable bar 108 having a hooked end arranged to engage the clutch member 98, and slide along the shaft 88 against the action of spring 104 thereby moving the teeth of the clutch elements out of engagement with each other. Movement of the bar 108 is effected by a bell crank 109 pivoted at 110 on a cross piece of the trailer frame and having its long arm disposed in the path of an adjustable trip screw 111 carried by a coupling carriage. The other bell crank arm projects rearwardly beneath the shaft 88 and is loosely pivoted to the outer end of the bar 108. The hooked end of the bar rests slidably on a stationary plate 112 in front of the upstanding portion of a pin 113 anchored in the plate. A tension spring 114 connecting the bar 108 with the depending portion of the pin 113 yieldingly holds the bar upon the plate 112 and against the pin. This spring also tends to slide the bar to the left, thereby holding the long bell crank forwardly as permitted by the carriage. 115 is a stop limiting the swing of the bell crank by the spring when the carriage is in its forward or uncoupled position.

The forward edge of the bar 108 is cut away to provide a shoulder 116 which engages a peripheral lug 117 on the hub of the clutch element 99 and slides said clutch element to the right when the long bell-crank arm is moved rearwardly by the carriage at the completion of the coupling operation. Such engagement can take place only when the clutch elements are together, the lug 117 raised by rotation of the element 99 clockwise, (see Figs. 3 and 7) and the bar 108 slid to the left. To thus condition the clutch and trigger mechanism when the parts are disengaged as in Fig. 8 which is their coupled position, it is necessary, first, to lower the lug 117 by moving the lever 87 rearwardly. This moves the teeth 100 rearwardly and permits the element 99 to spring into engagement with the element 98 under the action of spring 104 (see Fig. 6). In this position of the element 99, the lug 117 will be positioned beneath the end of the bar 108. Next, the lever 87 must be pulled forwardly as in Fig. 7 to rotate the element 99 clockwise, the lug 117 raising bar 108 about its pivoted point to the position shown in Fig. 13. Then, as the carriage moves forwardly during uncoupling, the spring 114 will be allowed to pull the bar 108 to the left, said bar falling down against the plate 112 when the shoulder 116 passes the lug 117 (see Fig. 3). Thus, by simply swinging the lever 87 rearwardly and then forwardly just prior to uncoupling the tractor and trailer, the trailer brakes will be set, the latches 59 will be released to permit uncoupling, and the control mechanism will be conditioned so that releasing of the brakes and locking of the carriage will take place automatically when the tractor is again coupled to the trailer. It will be noted that part of this conditioning is effected as the lever 87 is swung rearwardly and part when the lever is pulled forward.

Attention is directed to the fact that after the hand lever 87 has been oscillated forwardly prior to uncoupling the teeth 100 on the clutch element 99 constitute a retaining abutment for releasably holding the element 98 in actuated position and that the brakes and coupling lock are disengaged from the retaining means by the tripping hook 108. This arrangement permits of automatic operation of the brakes and coupling lock at the completion of coupling operation so that nothing need be done in coupling the tractor to the trailer except to back the tractor under the trailer.

*Operation*

The operation of coupling and uncoupling the tractor and trailer will now be described, assuming the parts to be in uncoupled position as shown in Figs. 3 and 4. In this position the trailer brakes will be held in set position by the lever 87. As the tractor is backed under the trailer, the wheels 31 will ride up the track 24 and the king pin 25 will be guided into the coupling socket striking the projections 52 and swinging the jaws together about the spherical portion of the king pin. The carriage will thus be locked to the tractor, the fifth wheel member 44 then sustaining the weight of the trailer on the tractor. Continued rearward movement of the tractor will slide the carriage rearwardly thereby raising the landing gear into the position shown in Fig. 1. As the carriage approaches this rearmost position, the trip screw 111 will strike the long arm of the bell-crank 109 to separate the clutch elements 98 and 99. Just as the carriage strikes the stops 53 at its rearward limit of travel, the bell crank will have moved sufficiently to separate the teeth of the clutch elements (see Fig. 8). This releases the brakes and lowers the shoulders 107 so as to permit the latches to spring downwardly behind the bracket shoulders 65 thereby locking the carriage to the trailer frame. Coupling is then complete and the tractor and trailer will be ready for combined operation.

When it is desired to uncouple the tractor from the trailer, the control lever 87 is swung backwardly and then pulled forwardly. The backward movement oscillates the shaft 88 and clutch element 99 thereon counter-clockwise, thereby moving the teeth 100 behind the teeth 101 as shown in Fig. 6 and at the same time lowering the lug 117 out of engaging relation with the shoulder 116 of the trip hook so that the element 99 can slide to the left under the action of the spring 104. This will bring the teeth of the clutch elements into interengaging relation. By the forward movement of the control lever, (see Fig. 7) the shaft 88, the clutch elements 98 and 99, and the sleeve 89 will be oscillated in a clockwise direction, pulling the brake rod forwardly and raising the latches above the shoulders 65. This also raises the lug 117 which then is in its left hand position beneath the end of the trip hook, the latter being held in its actuated position by the carriage. Thus the hook is raised about its loose pivot on the bell crank 109 and held in this inoperative position until after the carriage has started on its forward or uncoupling stroke. The tractor is then moved away from the trailer carrying with it the coupling carriage which lowers the supporting legs into the "over-center" position (see Fig. 4). At the end of the forward stroke of the carriage, the jaws 36 spread apart automatically and the king pin becomes freed from the carriage. Upon further movement of the tractor, the wheels 31 will roll down the track 24 until the landing-wheels rest upon the ground as shown in Fig. 4. The trailer is thus detached from the tractor, the brakes remaining set and the control mechanism being in condition to permit automatic coupling as above described.

If it is desired to move the trailer about when the tractor is not available, the brakes may be released by merely moving the control lever 87 rearwardly. Any suitable traction means may then be used to move the trailer. Of course, the control lever must be pulled forwardly before the trailer can again be coupled to the tractor.

It will be apparent that the semi-trailer thus provided is capable of handling extremely heavy loads safely and expeditiously. By providing a shiftable carriage for supporting the front end of the trailer, the load is evenly distributed on the rear end of the tractor, and the space on the tractor is efficiently utilized. All of the trailer mechanisms are associated with the carriage so that they will operate in a positive and efficient manner and under the control of a single manual operation.

Certain features of the coupling mechanism herein shown are disclosed and generically claimed in my copending application Serial No. 661,376, filed September 7, 1923.

I claim as my invention:

1. A trailer having, in combination, a frame, a clutch rotatably mounted on said frame comprising a driving element and a driven element, manual means for oscillating said driving element, brakes arranged to be set by oscillation of said driven element in one direction, and means for effecting disengaging movement of one of said elements only when said brakes are in set position, said last mentioned means while in brake-releasing position being ineffective to prevent subsequent setting of the brake.

2. The combination with a tractor and a trailer, of brakes for the trailer, brake setting means including a manually operable member and a clutch having two rotary parts arranged to move axially into and out of interengaging relation, means acting on said clutch to disengage said parts whereby to release said brakes, and actuating means for said releasing means including a mechanism adapted to slide rearwardly during coupling of the trailer and tractor and to engage said releasing means near the end of its rearward stroke.

3. The combination with a tractor and a trailer adapted to be coupled together for combined operation, of brakes for the trailer, manually operable brake setting means including a clutch having separable parts, a bell-crank mounted on said trailer and having one arm arranged to be connected to one of said clutch parts, and actuating means arranged to engage the other bell-crank arm whereby to separate said clutch parts and thereby release said brakes.

4. The combination with a tractor and a trailer adapted to be coupled together for combined operation, of brakes for the trailer, a shaft transversely mounted on the trailer, manually operable brake setting means for oscillating said shaft, two interengageable clutch elements mounted on said shaft, one connected to said brakes and the other arranged to oscillate with said shaft, means for disengaging said elements to release said brakes, said means having a disengageable connection with one of said elements, and means actuated by relative longitudinal movement between the tractor and trailer for actuating said last mentioned means.

5. The combination with a tractor and trailer adapted to be coupled together for combined operation, of brakes for the trailer, manually operable brake setting means, a shaft transversely mounted on the trailer, two interengageable clutch elements mounted on said shaft for relative axial movement, one of said elements being connected to said brakes and the other being arranged to rotate with said shaft, and means actuated by relative longitudinal movement between the tractor and trailer for separating said elements whereby to release said brakes.

6. The combination with a tractor and trailer adapted to be coupled together for combined operation of brakes for the trailer, a pair of axially movable clutch elements one being connected to said brakes, manually operable means acting through said elements to set said brakes and retain them in set position, and means actuated by relative movement between the tractor and trailer at the completion of the coupling operation to separate said elements.

7. The combination with a tractor and trailer, of brakes for the trailer, brake setting means including a manually operable lever on the trailer and a clutch having separable parts arranged for relative axial movement, and means operating automatically upon coupling of the tractor and trailer together to separate the parts of said clutch whereby to release said brakes.

8. The combination with a trailer and a tractor adapted to be coupled together for combined operation, of brakes for the trailer, manually operable brake setting means, a carriage mounted to slide back and forth in said trailer during coupling and uncoupling, means actuated by said carriage during its coupling stroke to release said brakes automatically after the brakes have been set by said manually operable means and independently of the position of the latter, and means operable during the forward stroke of said carriage to condition said releasing means for such automatic operation.

9. A vehicle having, in combination, a tractor, a trailer, means for coupling said trailer and tractor together, trailer brakes, two manually operable members for actuating the brakes and holding them in set position, one being connected directly to said brakes and the other having a disengageable connection with the brakes, and means for disconnecting said last mentioned member from the brakes whereby to permit actuation of the brakes by hand through the medium of said directly connected member while the other remains in set position.

10. A vehicle having, in combination, a tractor, a trailer, and means for coupling the tractor and trailer together for combined operation comprising a carriage mounted to slide on said trailer during coupling and uncoupling, means on said carriage arranged to engage a part on said tractor whereby to lock the carriage to the tractor automatically during coupling and to disengage said part automatically at the end of the uncoupling operation whereby to unlock said carriage and tractor, movable latches pivoted on said carriage and arranged to lock the carriage to the trailer automatically at the completion of the coupling operation, and manually operable means on the trailer for releasing said latches to permit uncoupling.

11. A combination vehicle comprising, in combination, a tractor section, a trailer section, and mechanism for coupling said sections together including a carriage mounted to slide on one of said sections during relative movement between the sections, means pivoted on said carriage for automatically connecting it to and disconnecting it from said other section during coupling and uncoupling respectively, and means pivoted on said carriage for locking it against movement relative to the trailer when said sections are coupled together.

12. A vehicle comprising, in combination, a tractor, a trailer, mechanism for coupling said tractor and trailer together comprising a king pin on the tractor, a carriage mounted to slide on the trailer during relative movement between the tractor and trailer, coupling jaws mounted on said carriage to swing on vertical axes and arranged to automatically engage and disengage said king pin during coupling and uncoupling respectively, and spring-pressed latch hooks pivoted on said carriage and adapted automatically to lock said carriage against movement on the trailer, and hand operated means for releasing said latch hooks.

13. A trailer having, in combination, with a tractor, a frame having longitudinally extending bars, a carriage mounted to slide back and forth between said bars, means on said carriage for connecting it with said tractor, a pair of brackets fixed to said frame bars, and latches on said carriage adapted to engage behind said brackets whereby to lock said carriage in the trailer frame, a rock shaft journaled in said brackets, and means carried by said shaft and arranged to release said latches to permit forward movement of said carriage.

14. A trailer having, in combination, with a tractor, a frame, a shaft transversely mounted in said frame, a carriage adapted to slide back and forth in said trailer during coupling and uncoupling with the tractor, means for connecting said carriage and said tractor, latch mechanism carried by said carriage and arranged to become engaged behind said shaft automatically whereby to hold the carriage in its rearmost position during combined operation of the tractor and trailer, and means on said shaft for releasing said latch mechanism whereby to permit uncoupling of the tractor and trailer.

15. A vehicle having, in combination, a trailer frame, a carriage mounted to slide in said frame during coupling and uncoupling of the trailer and tractor, a pair of coupling jaws pivoted on said carriage and adapted to connect the carriage to the tractor, and means for holding said jaws spread apart when the trailer is detached from the tractor.

16. A vehicle having, in combination, a tractor having a king pin, a trailer frame, coupling mechanism on the trailer providing a socket for said king pin, and means arranged to be engaged and disengaged by said king pin during coupling and uncoupling respectively for holding said socket open while the trailer is detached from the tractor.

17. A vehicle having, in combination, a tractor, a trailer having longitudinally extending frame bars, a carriage slidably supported between two of said bars, a pair of parallel bars stationarily mounted between said carriage-supporting bars, and coupling jaws each pivoted on said carriage and arranged to ride along the inner face of one of said stationary bars during movements of the carriage, said jaws being adapted to engage a part on the tractor whereby to couple a carriage to the tractor.

18. A vehicle having, in combination, a tractor, a trailer having longitudinally extending frame bars, a carriage mounted between two of said bars to slide rearwardly and forwardly during coupling and uncoupling respectively, means to lock said carriage in its rearmost position, a pair of coupling jaws pivoted on said carriage to swing on vertical axes and adapted to connect the carriage to the tractor, parallel bars stationarily mounted between said frame bars and extending through said carriage, the inner faces of said stationary bars being shaped to hold said jaws closed as the carriage moves toward and from its rearward position and to permit opening of the jaws when the carriage is in its foremost position.

19. A vehicle having, in combination, a tractor section, a trailer section, a stationary plate on the rear end of said tractor section, a king pin rising above said plate, a carriage mounted to slide in said trailer section during coupling and uncoupling, said member having a socket arranged to be closed about said king pin, and a fifth wheel plate pivoted on said carriage to swing on a horizontal axis, said plate being adapted to rest upon said stationary plate and sustain the weight of the trailer on the tractor.

20. A combination vehicle comprising, in combination, a tractor, a trailer, a carriage slidably mounted on said trailer, means for connecting said carriage to the tractor, a plate mounted on said tractor and constituting a stationary fifth-wheel member, and a movable fifth wheel member pivoted on said carriage and adapted to rest upon said plate when the trailer is coupled to the tractor.

21. A vehicle having, in combination, a tractor and a semi-trailer adapted to be coupled together for combined operation, trailer brakes, means for supporting the trailer at the forward end when detached from the tractor, mechanism controlling the operation of said brakes and supporting means including a clutch mounted in the trailer having disengageable parts, and means actuated by relative movement between the tractor and trailer during coupling for disengaging the parts of said clutch.

22. A vehicle having, in combination, a tractor and a semi-trailer adapted to be coupled together for combined operation, trailer brakes, means for supporting the trailer at its forward end when uncoupled from the tractor, mechanism controlling the operation of said brakes and supporting means including a clutch mounted on the trailer having separable parts, means for separating said clutch parts including a bell-crank having an engageable connection with one of said clutch parts, and means for actuating said bell-crank.

23. A vehicle having, in combination, a tractor, a semi-trailer, mechanism for coupling said tractor and trailer together for combined operation, trailer brakes, means for supporting said trailer at its forward end when detached from the tractor, mechanism mounted in said trailer and adapted to control the operation of said brakes, said coupling mechanism and said supporting means, and two independent means for actuating said control mechanism.

24. A vehicle having, in combination, a tractor, a semi-trailer, mechanism for coupling said tractor and trailer together for combined operation, trailer brakes, means for supporting said trailer at its forward end when detached from the tractor, mechanism mounted in said trailer and adapted to control the operation of said brakes, said coupling mechanism and said supporting means, and two independent means for actuating said control mechanism, one being manually operable and the other being operable automatically by relative movement between the tractor and trailer.

25. A vehicle having, in combination, a tractor having a king pin thereon, a semi-trailer, a carriage mounted to slide on said trailer during coupling and uncoupling of the trailer and tractor, means on said carriage arranged to engage said king pin automatically at the beginning of the coupling operation and to disengage the king pin automatically at the end of the uncoupling operation, automatic means for locking the carriage against movement at the end of the coupling operation, trailer supporting means adapted to be raised and lowered by said carriage during coupling and uncoupling respectively, brakes for the trailer, manual means for setting said brakes and simultaneously releasing said locking means to permit uncoupling, and means actuated by said carriage at the completion of its coupling stroke to render said manual means ineffective.

26. A vehicle having, in combination, a tractor and trailer adapted to be coupled together for combined operation, a mechanism mounted to slide back and forth in said trailer during coupling and uncoupling respectively, landing gear directly connected to said mechanism and arranged to be raised and lowered thereby during coupling and uncoupling, trailer brakes, manual means for setting said brakes and permitting forward movement of said slidable means, and means actuated by said slidable mechanism to render said setting means ineffective.

27. A vehicle having, in combination, a tractor, a semi-trailer, coupling mechanism arranged to slide back and forth in said trailer during coupling and uncoupling respectively and including means for locking the tractor and trailer in coupled relation, trailer brakes, a member adapted when actuated to set said brakes and release said locking means to permit uncoupling, means adapted to be connected to said member for actuating the same manually, and means actuated by said carriage at the end of its stroke rearwardly to break the connection between said member and said actuating means.

28. A vehicle having, in combination, a tractor, a trailer, coupling mechanism including means for locking the tractor and trailer in coupled relation, trailer brakes, mechanism on the trailer controlling the operation of said brakes and said coupling mechanism, manually operable means acting on said control mechanism to set said brakes and release said locking means, and automatically operable means for rendering said manual means ineffective in holding the brake set and the locking means released, said control mechanism being conditioned for operation by said automatic means by the prior actuation of said manual means.

29. A vehicle having, in combination, a tractor, a trailer, coupling mechanism including means for locking the tractor and trailer in coupled relation for traveling, trailer brakes, manually operable means for setting said brakes and releasing said locking means to permit uncoupling, and means operating automatically at the completion of the coupling operation to render said manually operable means ineffective in holding the brake set and the locking means released.

30. A vehicle having, in combination, a tractor, a trailer, mechanism for coupling said tractor and trailer together for combined operation, trailer brakes manually operable means arranged to be actuated prior to uncoupling of tractor and trailer to release said coupling mechanism and to set said brakes and retain them in set position, and means operating automatically by relative movement between the tractor and trailer during coupling to render said manually operable means ineffective.

31. A vehicle having, in combination, a trailer, a tractor, mechanism for coupling the tractor and trailer together and arranged to slide back and forth on the trailer during coupling and uncoupling, trailer brakes, a member controlling the operation of said brakes and the movements of said coupling mechanism forwardly, manually operable means operating on said control member to set said brakes and to release said coupling mechanism for forward movement, and means actuated by said coupling mechanism during its rearward movement to disconnect said manually operable means and said control member.

32. A vehicle having, in combination, a tractor, a trailer, a carriage mounted on said trailer and arranged to be moved on the trailer by the tractor during coupling and uncoupling, means for latching said carriage in its rearmost position, brakes for the trailer, a single manual means for setting said brakes and releasing said latching means to permit uncoupling, and means operable by said carriage as it reaches its rearmost position to release said brakes and to permit latching of said carriage.

33. A vehicle having, in combination, a tractor, a trailer, means for connecting said tractor and trailer together for combined operation, a clutch having disengageable parts mounted on the trailer, brake setting and coupling releasing means associated with and operated by one of said parts, means associated with said other part for actuating said brakes and releasing means and for holding them in actuated position, and means for disconnecting said parts while said actuating means remains in active position.

34. A vehicle having, in combination, a tractor, a trailer, coupling mechanism including means for holding said tractor and trailer in coupled relation, brakes for the trailer, control mechanism including a clutch having disengageable parts mounted in the trailer, brake setting means including means for releasing said holding means, said brake setting means being associated with one of said clutch parts, manual actuating means associated with the other of said parts, and means operable automatically upon coupling of the tractor and trailer for disengaging said parts, whereby to release said brakes and said releasing means.

35. The combination with a tractor and a trailer of brakes for the trailer, coupling mechanism including means for latching said tractor and trailer in coupled relation, mechanism common to said brakes and coupling mechanism for controlling their operation, manually operable means acting through said control mechanism to set said brakes and to release said latching means, and means operating on said control mechanism during coupling of the tractor and trailer to render said manually operable means ineffective.

36. The combination with a tractor and a trailer of means for coupling said tractor and trailer together, trailer brakes, mechanism controlling the operation of said brakes and coupling means, mechanism acting on said control mechanism to permit coupling and to release said brakes, and manually operable means for conditioning said control mechanism for actuation by said releasing means.

37. The combination of a tractor and a trailer, of brakes for the trailer, coupling mechanism including means for locking the tractor and trailer in coupled relation, means controlling the operation of said brakes and said coupling mechanism, two separate actuating means operating on said control means, one adapted to release said brakes and to permit locking of said coupling mechanism and the other adapted to set the brakes, to release said locking means and to condition said control mechanism for operation by said first mentioned actuating means.

38. A vehicle having, in combination, a tractor, a trailer, mechanism for coupling the tractor and trailer together for combined operation, brake mechanism for holding the trailer stationary during coupling and uncoupling with the tractor, supporting mechanism adapted to be moved into and out of ground-engaging position, and a single control device arranged to be moved by hand out of and back into a given position prior to uncoupling of the tractor and trailer whereby to control the operations of said mechanisms necessary to effect uncoupling and coupling of the tractor and trailer by subsequently driving the tractor forwardly in uncoupling and rearwardly in coupling.

39. A combined vehicle of the character described comprising, in combination, a tractor, a trailer, a head mounted on said trailer for movement back and forth thereon during coupling and uncoupling of the tractor and trailer, a king pin on the tractor, means on said head providing a socket for receiving said king pin whereby to connect the head and said tractor together, means for locking said head in its rearmost position, and a single means for locking said head in its foremost position and said socket in open position.

40. A combined vehicle of the character described comprising, in combination, a tractor, a trailer, an element mounted to move back and forth on the trailer, coupling mechanism by which said element may be connected to the tractor, means operable to retain said element in its rearward or coupled position on the trailer, and a fifth-wheel construction disposed between said element and the tractor for sustaining the weight of the trailer and permitting swiveling of the tractor and trailer about vertical and horizontal axes, said fifth-wheel comprising a member stationarily mounted on the tractor and providing a horizontally disposed surface and a movable member pivoted on said element to swing on a horizontal axis, and adapted to rest upon said surface when the tractor and trailer are coupled together.

41. A combined vehicle of the character described comprising, in combination, a tractor section, a trailer section, a head mounted on said trailer section to move back and forth thereon by movement of the tractor section in coupling to and uncoupling from the trailer section, two interengageable coupling devices one on said tractor section and the other on said head, one of said devices comprising a king pin disposed in vertical position when the sections are coupled together, said other device comprising a pair of jaws adapted to provide a socket for said king pin, and a fifth-wheel construction between said tractor section and said head adapted to sustain the weight of the trailer section when the sections are coupled together and to permit swiveling of the sections about a horizontal axis and about the axis of said king pin, said fifth-wheel construction comprising a plate mounted on said tractor section and having a horizontally disposed upper surface and a second plate pivotally mounted on said head to swing on a horizontal axis and adapted to rest upon said first mentioned plate.

42. In a combined vehicle of the character described comprising a tractor and semi-trailer, the combination of coupling mechanism through the medium of which the power of the tractor is applied to the trailer including an element mounted on the trailer to move back and forth during coupling and uncoupling of the tractor and trailer, means operable to lock said element to the trailer at the completion of its coupling stroke, a brake for the trailer, a support for the forward end of the trailer operatively associated with said element and arranged to be moved into active position in the forward movement of said element during uncoupling, and a single means operable by hand to apply said brake and release said locking means whereby to permit uncoupling of the tractor and trailer and movement of said support into active position.

43. A combined vehicle of the character described comprising, in combination, a tractor, a semi-trailer, coupling mechanism by which said tractor may be detached from the trailer or connected to the trailer for drawing the same, brake mechanism for maintaining the position of the trailer while the tractor is moving relative thereto in coupling or uncoupling, a common means adapted when actuated to condition both of said mechanisms for uncoupling and for automatic operation in the succeeding coupling operation, and means operable automatically upon the conditioning of said mechanisms for uncoupling to releasably retain them in such condition independently of said actuating means and pending relative uncoupling movement between the tractor and trailer.

44. A combined vehicle of the character described comprising, in combination, a tractor, a semi-trailer, coupling mechanism by which said tractor may be detached from the trailer or connected to the trailer for drawing the same, said mechanism including an element mounted to move back and forth on the trailer in the movement of the tractor, means to lock said element on the trailer at the completion of its coupling stroke, a brake for maintaining the position of the trailer during coupling and uncoupling, and hand operated means adapted when actuated to apply said brake and unlock said element to permit forward movement thereof.

45. A combined vehicle of the character described comprising, in combination, a tractor, a semi-trailer, a brake for said trailer, an element mounted to move back and forth on the trailer during coupling and uncoupling of the tractor and trailer respectively, coupling mechanism by which said element may be connected to the tractor, means operable to lock said element in its rearward or coupled position so that the trailer may be drawn by the tractor through the medium of said element, control means adapted when actuated to condition said tractor and trailer for uncoupling by applying said brake and releasing said locking means, and means actuated at the completion of the coupling stroke of said element to cause said brakes to be released and said locking means to be moved into locking position.

46. A combined vehicle of the character described comprising, in combination, a tractor, a semi-trailer, an element on the trailer adapted to be coupled to the tractor and to be moved back and forth on the trailer as the tractor moves longitudinally thereof during coupling and uncoupling respectively, a brake for maintaining the position of the trailer during coupling and uncoupling, means operable to lock said element in its coupled position on the trailer so that the tractive force of the tractor may be applied to the trailer through the medium of said element, and a single means operable under manual control to apply said brake and release said locking means to permit of forward movement of said element by the tractor.

47. A combined vehicle of the character described comprising, in combination, a tractor, a semi-trailer, coupling mechanism through the medium of which the power of the tractor is applied to the trailer including an element mounted on the trailer to move back and forth during coupling and uncoupling of the tractor and trailer, a locking member operable to hold said element in coupled position during combined operation of the tractor and trailer, hand operated means adapted when actuated to move said member into unlocking position, retaining means rendered operative in the operation of said hand operating means to hold said member in unlocking position whereby to permit of forward movement of said element by the tractor, and means actuated automatically in the movement of the tractor relative to the trailer for rendering said retaining means inoperative thereby permitting movement of said member into locking position at the completion of the coupling stroke of said element.

48. A combined vehicle of the character described comprising, in combination, a tractor, a semi-trailer, coupling mechanism through the medium of which the power of the tractor is applied to the trailer including an element mounted on the trailer to move back and forth during coupling and uncoupling of the tractor and trailer, a locking member normally tending to move into a position to hold said element in its coupled position, retaining means operable to hold said member in unlocking position whereby to permit of forward movement of said element, and means operated automatically in the movement of the tractor relative to the trailer to render said retaining means inoperative thereby permitting movement of said member into locking position when said element reaches the end of its coupling stroke.

49. A combined vehicle of the character described comprising, in combination, a tractor, a semi-trailer, coupling mechanism by which the tractor and trailer may be connected together for combined operation including a member adapted to lock the tractor and trailer in coupled relation, a hand operable control device by which said member may be moved into unlocking position, retaining means operable to hold said locking member in unlocking position whereby to permit of uncoupling by forward movement of the tractor, and means operating automatically in a subsequent movement of the tractor in coupling to the trailer to release said locking member for movement into locking position.

50. In a combined vehicle of the character described comprising a tractor and a semi-trailer, the combination of coupling mechanism by which said tractor may be connected to the trailer for drawing the same, a lock for maintaining coupled relation of the tractor and trailer including a member associated with said mechanism and normally tending to move into locking position, means adapted to be operated by hand to move said member into unlocking position, and means rendered operative by the actuation of said hand operated means to retain said member in unlocking position whereby to permit uncoupling of the tractor and trailer, and means operating in a subsequent movement of the tractor relative to the trailer to render said retaining means inoperative whereby to permit said member to move into locking position at the completion of the coupling operation of the tractor and trailer.

51. In a combined vehicle of the character described comprising a tractor and a semi-trailer arranged to be connected and disconnected by movement of the tractor toward and away from the trailer, the combination of mechanism controlling the coupling and uncoupling operation of the tractor and trailer, and means adapted to be actuated by hand prior to each uncoupling operation to condition said control mechanism so as to permit uncoupling by forward movement of the tractor and also to condition said control mechanism for automatic operation in the succeeding coupling operation by rearward movement of the tractor.

52. A combined vehicle of the character described comprising, in combination, a tractor, a semi-trailer, coupling mechanism by which the tractor may be connected to the trailer for drawing the same, an element movable in opposite directions to lock and unlock said coupling mechanism, retaining means adapted to be engaged by said element when the element is in unlocking position, a tripping member operable automatically to disengage said element and said retaining means at the completion of the coupling operation of the tractor and trailer whereby to permit locking of said coupling mechanism, and means operating in the subequent movement of said element to unlocking position to render said tripping member inoperative thereby permitting of engagement between said element and said retaining means.

53. A combined vehicle of the character described comprising, in combination, a tractor, a semi-trailer, coupling mechanism for connecting the tractor and trailer including a head mounted to move back and forth on the trailer as the tractor moves rearwardly and forwardly during coupling and uncoupling, a locking member operable to hold said head in its rearward or coupling position, an element operatively associated with said member and movable in opposite directions to lock and unlock said head, retaining means adapted to engage said element when the element is in unlocking position, tripping means actuated by said head as it approaches coupled position to disengage said element and said retaining means whereby to permit said member to move into locking position, and means operating in the subsequent movement of said element to unlocking position to render said tripping means inoperative thereby permitting of engagement between said element and said retaining means while said head remains in coupled position.

54. A combined vehicle of the character described comprising, in combination, a tractor, a semi-trailer, coupling mechanism for connecting the tractor and trailer including a head mounted to move back and forth on the trailer as the tractor moves rearwardly and forwardly during coupling and uncoupling, a locking member operable to hold said head in its rearward or coupling position, an element operatively associated with said member and movable in opposite directions to lock and unlock said head, retaining means adapted to engage said element when the element is in unlocking position, tripping means actuated by said head as it approaches coupled position to disengage said element and said retaining means whereby to permit said member to move into locking position, and means operating in a subsequent movement of said head to render said tripping means operative.

55. A combined vehicle of the character described comprising, in combination, a tractor, a semi-trailer, coupling mechanism by which the tractor and trailer may be connected for combined operation, locking means for said coupling mechanism, retaining means, an element associated with said locking means and adapted for movement in opposite directions to lock and unlock said coupling mechanism and for independent movement to engage and disengage said retaining means, hand operated means for moving said element into unlocking position, a tripping member adapted for operative engagement with said element when the element is in unlocking position and the tractor and trailer are wholly or partially uncoupled, and means actuated by the tractor in coupling to the trailer to move said tripping means in a direction to disengage said element and said retaining means.

56. A combined vehicle of the character described comprising, in combination, a tractor, a semi-trailer, coupling mechanism by which the tractor and trailer may be connected including a head mounted to move back and forth on the trailer during coupling and uncoupling, a lock for holding said head in its rearward or coupled position including an element movable between locking and unlocking positions, hand operable means by which said element may be moved into unlocking position to permit forward movement of said head, retaining means rendered operative in the actuation of said element by said hand operable means and adapted to hold said element in unlocking position, and means actuated in a subsequent movement of said head to render said retaining means inoperative whereby to permit automatic locking of said coupling mechanism.

57. A combined vehicle of the character described comprising, in combination, a tractor, a semi-trailer, coupling mechanism including a head mounted for movement back and forth on the trailer during coupling and uncoupling of the tractor and trailer respectively, a member movable between locking and unlocking positions to lock and unlock said head, a catch on said member, means providing an abutment adapted to engage said catch and hold said member in unlocking position to permit of forward movement of said head by the tractor, and means operating automatically in the rearward movement of said head during coupling to disengage said catch and said abutment whereby to permit movement of said member into locking position at the completion of the coupling stroke of said head.

58. A combined vehicle of the character described comprising a tractor and a semi-trailer adapted to be connected for combined operation, a brake for the trailer, a retaining member, an element associated with said brake and adapted for movement in opposite directions to set and release said brake and for independent movement to engage and disengage said retaining means, hand operable means for moving said element into brake-setting position prior to uncoupling for engagement with said retaining member, a tripping device adapted for engagement with said element when the element is in brake-setting position and the tractor and trailer are in uncoupled relation, and means actuated by the tractor in coupling to the trailer to move said tripping device in a direction to disengage said element and said retaining member.

59. A combined vehicle of the character described comprising a tractor and a semi-trailer, coupling mechanism including a carriage mounted to move back and forth on the trailer as the tractor couples to or uncouples from the trailer, a brake for the trailer, an element movable in opposite directions to set and release said brake, retaining means adapted for engagement with said element when the element is in brake-setting position, a trip device operated by said carriage at the end of its coupling stroke to disengage said element and said retaining means whereby to release said brake, and means operable in the subsequent movement of said element to brake-setting position while the carriage is in coupled position to hold said member inoperative thereby permitting of engagement between said element and said retaining means.

60. A combined vehicle of the character described comprising a tractor and a semi-trailer adapted to be connected for combined operation, a brake for the trailer, an element associated with said brake and adapted for movement into one position to apply said brake and into another position to release the brake, hand operable means by which said element may be moved into brake-settting position, retaining means adapted for engagement with said element and operable to hold said brakes set to permit uncoupling of the tractor from the trailer, a tripping member actuated by movement of the tractor at the completion of the coupling operation and operable in such actuation to disengage said element and said retaining means thereby releasing said brake, and means operating while the tractor and trailer are coupled together to hold said member in inactive position so as to permit actuation of said element by said hand operable means prior to uncoupling of the tractor and trailer.

61. A combined vehicle of the character described comprising, in combination, a tractor section, a trailer section, a king pin on one of said sections, means providing a socket for said king pin including a pair of coacting members mounted on said other section to be spread apart and permit the entry of said king pin during coupling of said sections, and a device mounted for movement independent of said members and arranged to be moved into and out of locking engagement with the members by a camming action of said king pin in leaving and entering said socket whereby to maintain said members spread apart while the sections are disconnected.

62. A combined vehicle of the character described comprising, in combination, a tractor section, a trailer section, a king pin projecting rigidly from one of said sections, a pair of jaws mounted on the other section for horizontal movement and providing a socket adapted to receive said king pin during relative movement between said sections in the coupling thereof, and a vertically movable locking member mounted for movement into and out of locking engagement with said jaws to hold said socket open when the sections are disconnected, said member being positioned for engagement with the end of said king pin and adapted to be raised thereby out of locking position as the king pin enters the coupling socket.

In testimony whereof, I have hereunto affixed my signature.

ADDI BENJAMIN CADMAN.